Aug. 2, 1960    J. R. ORELIND ET AL    2,947,367
DRAFT CONTROL FOR IMPLEMENTS
Filed Oct. 5, 1956    5 Sheets-Sheet 5
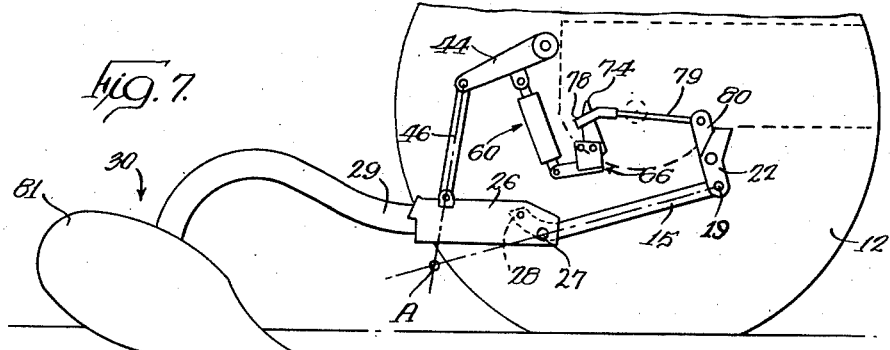
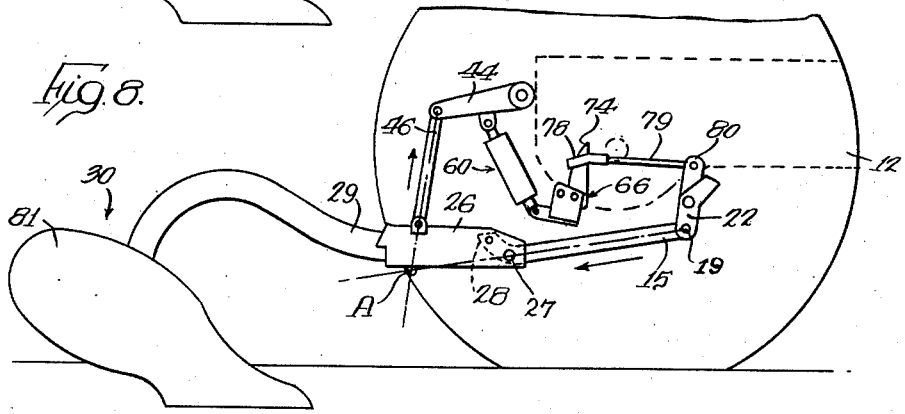
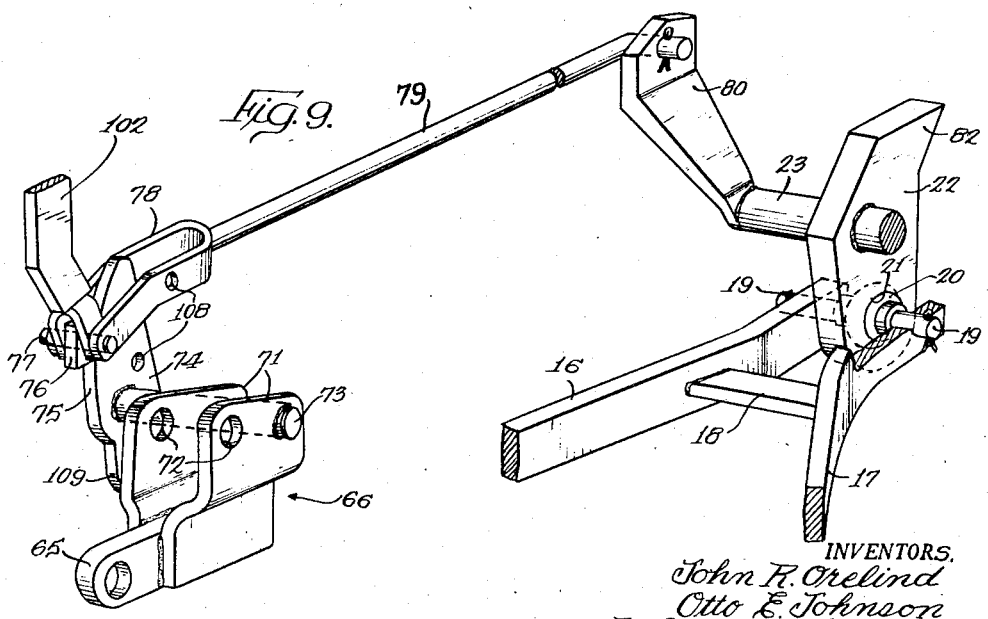
INVENTORS.
John R. Orelind
Otto E. Johnson
By Paul O. Pippel
Atty.

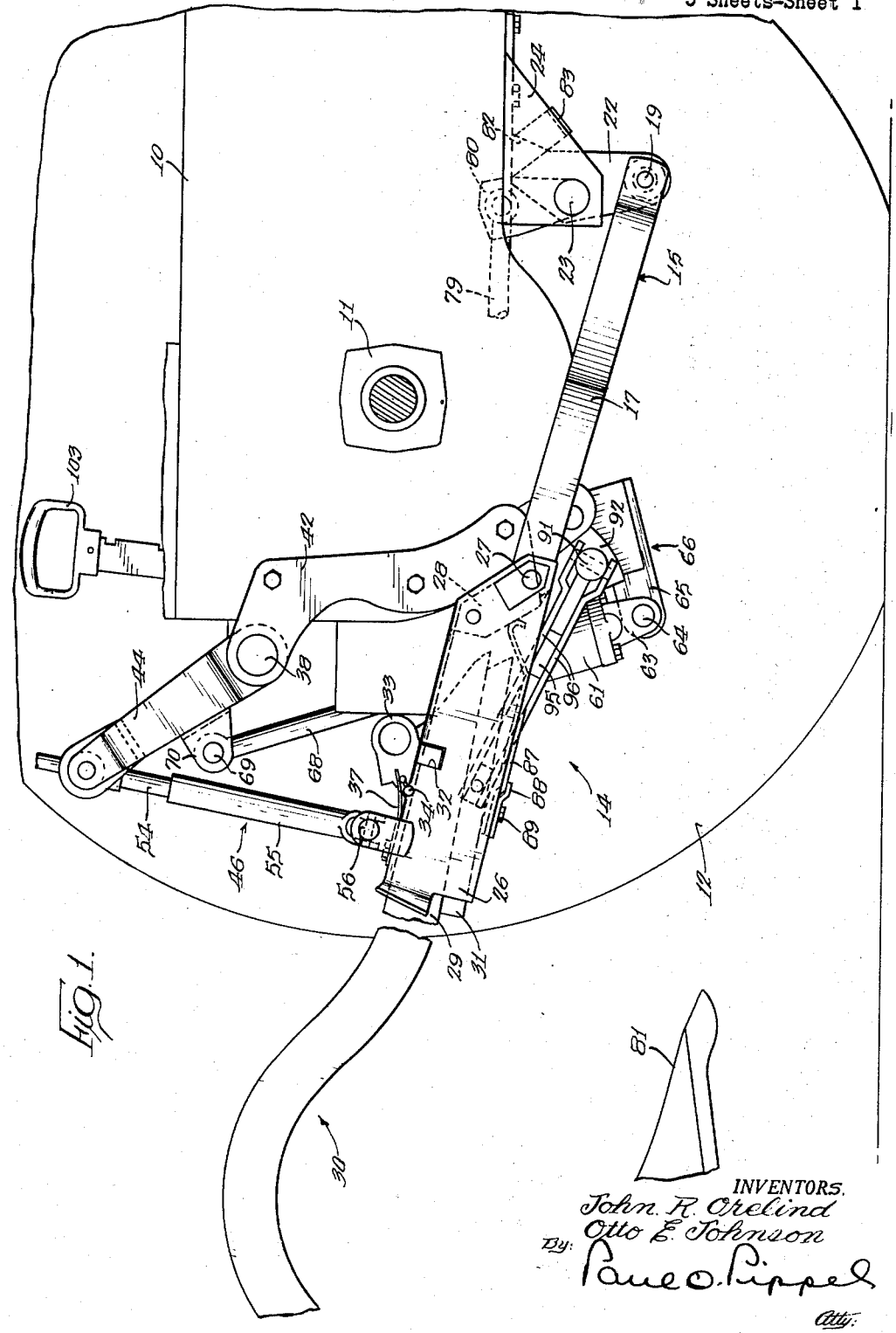

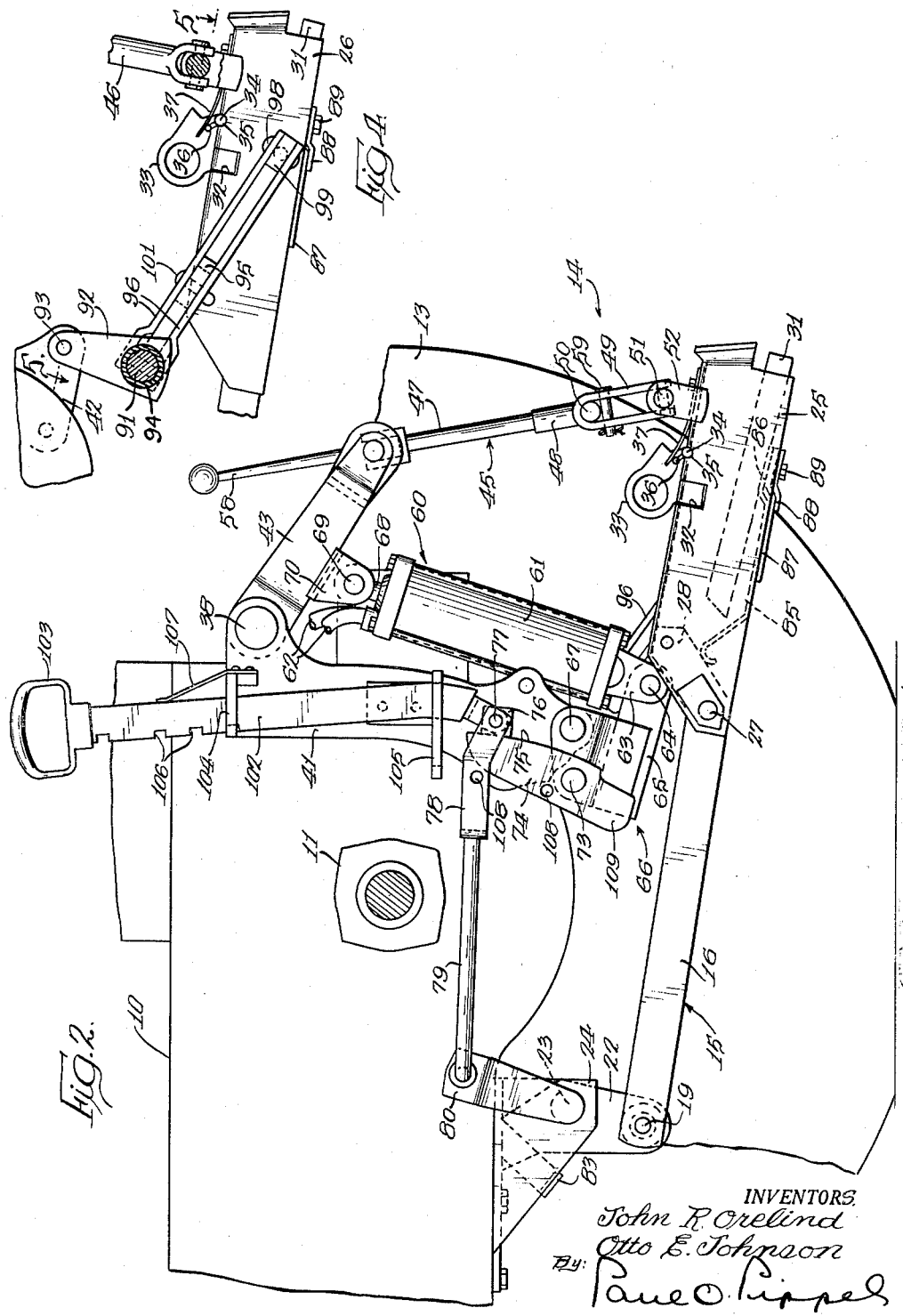

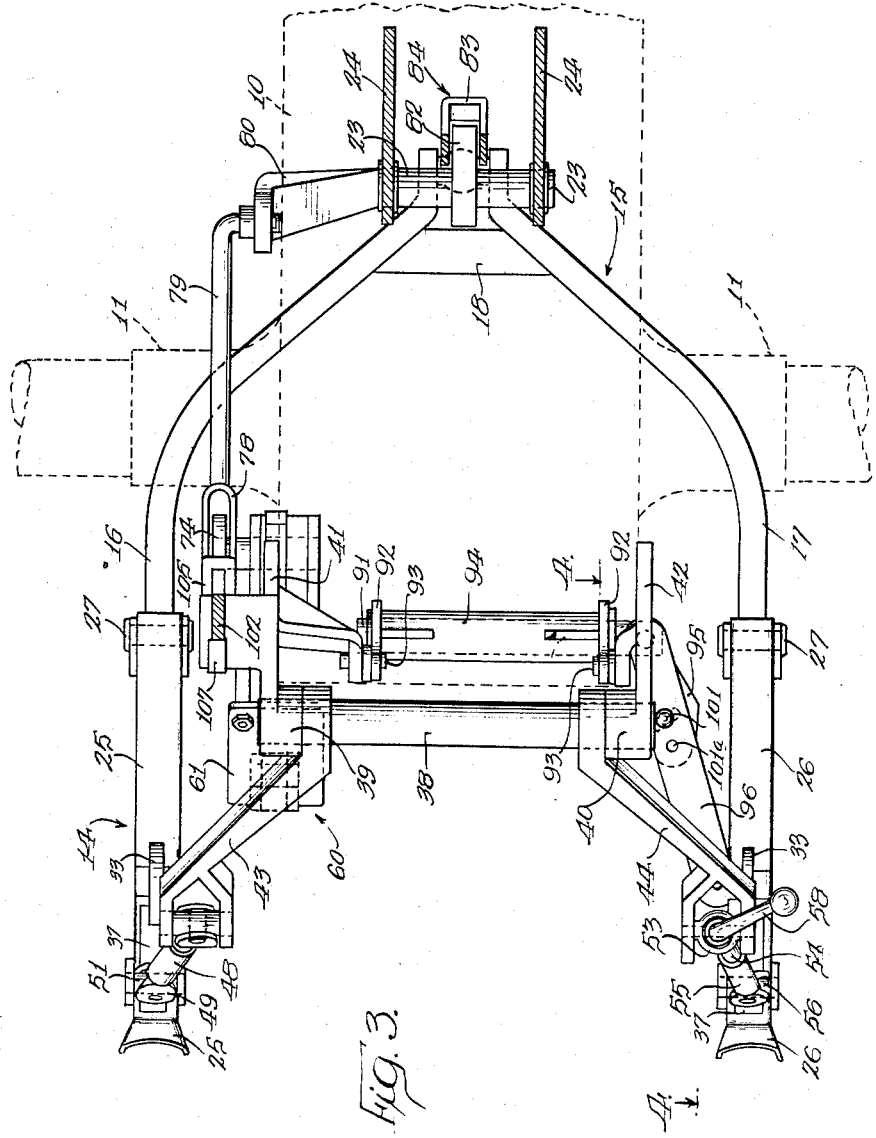

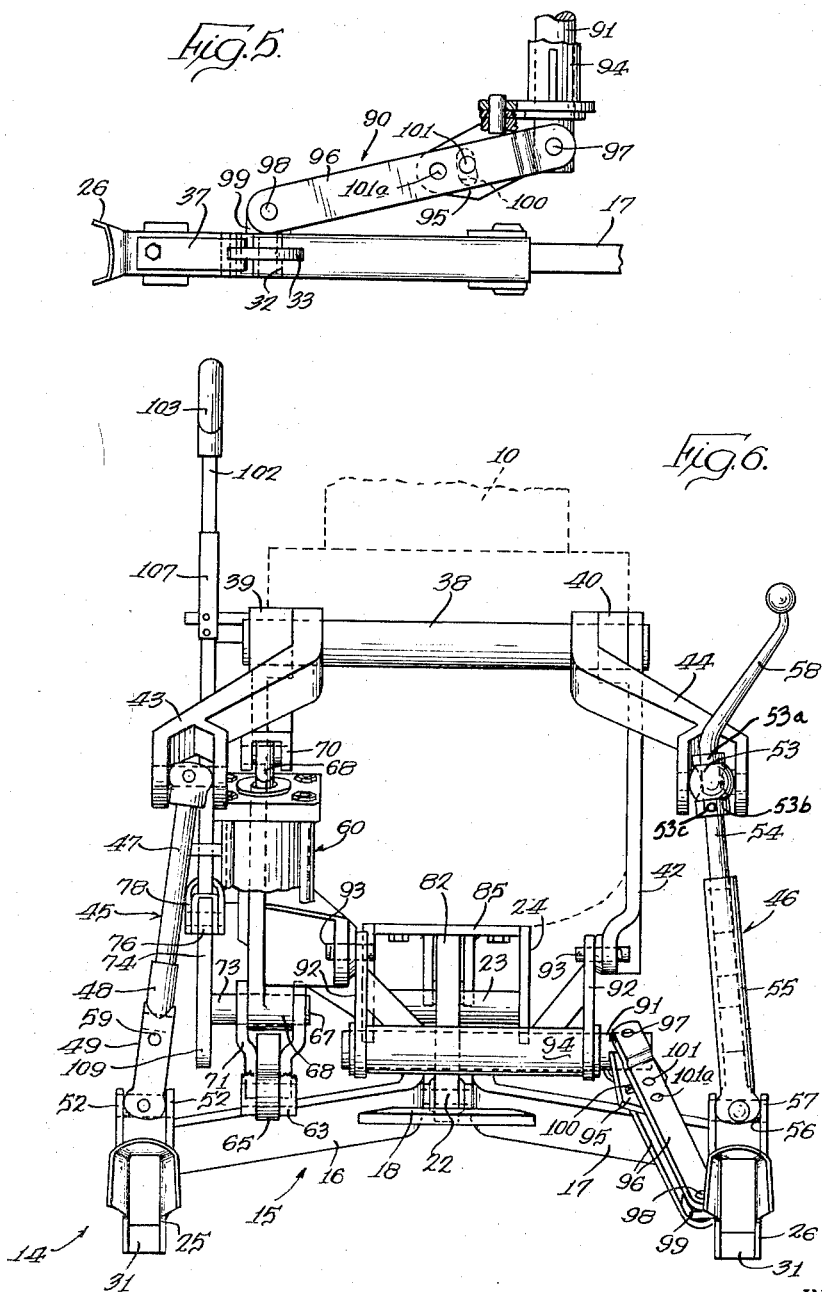

United States Patent Office 2,947,367
Patented Aug. 2, 1960

2,947,367

DRAFT CONTROL FOR IMPLEMENTS

John R. Orelind, Wilmette, and Otto E. Johnson, Canton, Ill., assignors to International Harvester Company, a corporation of New Jersey Filed Oct. 5, 1956, Ser. No. 614,110

10 Claims. (Cl. 172—239)

This invention relates to agricultural implements and particularly to earth working implements adapted to penetrate the soil and to be propelled by a tractive vehicle such as a tractor. More specifically, the invention concerns tractor mounted implements wherein the implement is carried by the tractor, and wherein means are provided for utilizing the draft forces acting upon the implement to maintain uniform operation of the earth working tools in the ground.

The principle of utilization of the draft load on an agricultural implement or the like to maintain uniform operation thereof under varying conditions of soil density, texture, etc. is well-known. In the case of an implement such as a disk harrow, cultivator, etc., it is usually considered that under normal soil conditions, weight added to the implement improves the operating efficiency thereof by holding it to its work.

One means of accomplishing the result of uniform penetration of the earth working tools in the ground has been the translation of the implement's own draft forces acting thereon into another force tending to keep the earth working tools operating at a uniform depth in the soil, irrespective of variations in the type of soil affecting the ease with which it is penetrated by the tools. In the case of disking tools, for instance, this draft force has been utilized through suitable force-transmitting means to add weight to the implement to urge it downwardly and into the ground. Apparatus for accomplishing this is illustrated and described in the patent to Dooley et al. 2,515,637, for example, wherein the connection of the implement to the tractor is made through the familiar "three-point" linkage, and wherein the upper link performs its usual function of a thrust rod transmitting the draft forces acting on the implement and reacting against the tractor.

In the Dooley et al. patent referred to, the upper thrust link from the implement is connected to a bell crank mounted on the tractor, one arm of which is connected by a rod to the lower attaching link for the implement. The other arm of the bell crank is connected to the upper thrust link so that, when force is transmitted thereby to rock the bell crank, this force is in turn transmitted through said lifting connection to urge the implement downwardly.

In the case of other implements such as a plow of the moldboard type which seeks its own depth determined by the disposition of a line drawn through its center of resistance and its hitch point on the tractor, the working tool has less difficulty remaining in the ground and it often becomes desirable to give more consideration to maintaining the traction of the wheels of the tractive vehicle than to holding the tool to its work.

In Ferguson 2,118,180, the upper thrust link actuates the hydraulic power lift control means of the tractor to lift the implement when a draft load is encountered which the tractor would have difficulty overcoming. The patent to Burkholder 2,547,438 also concerns a hitch of the three-point type and a bell crank on the tractor for mechanically transferring the weight of the implement to the tractor.

The present invention contemplates the provision of improved control means for a tractor attached implement wherein the attaching apparatus for connecting the implement to the tractor does not include an upper thrust link such as is provided by the three-point attachment referred to above, and longitudinal movement of the implement relative to the tractor is utilized directly to maintain the implement substantially level at all times while maintaining a balance between the effective weight of the implement and the draft forces encountered thereby.

An important object of the invention is the provision of improved hitch means for connecting an implement such as a plow to a tractor, including improved means for automatically maintaining uniform operation under varying soil conditions affecting the draft load on the implement.

Another object of the invention is the provision of improved means connecting an earth working implement such as a plow to a tractor wherein means are incorporated in the hitch means adapted to automatically compensate for variations in the draft load on the plow and the effect thereof on the traction of the propelling vehicle.

Another object of the invention is the provision of an improved hitch means for connecting an implement such as a plow to a tractor, wherein means are provided for maintaining the earth working tools substantially level with the ground and operating at a uniform depth irrespective of variations in draft load on the plow caused by operating in soil of varying density, texture, dampness, etc.

A further object of the invention is the provision of an improved implement and tractor hitch assembly including a draft connection accommodating horizontal movement of the plow in a substantially straight line rearwardly relative to the tractor in response to draft forces acting thereon, wherein means are provided for translating said draft forces into a lifting force on the implement.

Another object of the invention is the provision of an improved attaching structure of the two-point type for a tractor wherein the draft structure includes drawbar means having laterally spaced longitudinally elongated socket members pivotally mounted thereon for vertical swinging on a transverse axis relative to the drawbar and adapted to slidably receive complementary longitudinally elongated shaft members on the implement, and wherein the drawbar is connected to the tractor for longitudinal movement in response to draft forces on the implement.

Still another object of the invention is the provision of an improved hitch structure for connecting an implement to a tractor to be carried thereby in transport, including an implement-supporting draft structure connected to the tractor in draft-receiving relation forwardly of the rear axle of the tractor and a lift link connecting the draft structure to the tractor power lift means, wherein said lift link serves as a part of said draft structure and a virtual hitch point is provided rearwardly of the rear axle structure and close to the implement for quick response to variations in draft conditions.

A further object of the invention is the provision of an improved implement and tractor hitch assembly including a draft connection accommodating movement of the implement relative to the tractor in response to draft forces acting thereon, wherein the traction of the tractor drive wheels is amplified by transferring implement weight thereto, and wherein optionally operable means are provided for utilizing the draft forces acting on the implement to apply down pressure on certain types of implements to hold the tools in the ground.

Other objects and advantages of the invention will become clear from the following detailed description when read in conjunction with the accompanying drawings wherein:

Figure 1 is a view in side elevation of the rear end of a tractor with one wheel removed showing an implement attaching apparatus and draft control mechanism incorporating the features of this invention associated therewith and having a moldboard plow connected thereto, the implement and its attaching apparatus being shown in a position corresponding to the transport position of the implement, Figure 2 is a view in side elevation of the rear end of the tractor from the other side thereof, with one wheel removed, and illustrating the position of the parts of the implement attaching and draft control apparatus in a lowered or operating position, Figure 3 is a plan view, partly in section, of the implement attaching apparatus of this invention, with the position of the tractor indicated in dotted lines, Figure 4 shows a part of the implement stabilizing means and is a section taken on the line 4—4 of Figure 3, Figure 5 is a section taken on the line 5—5 of Figure 4, Figure 6 is an end elevation of the structure shown in Figure 3, with the position of the tractor also indicated in dotted line, Figure 7 is a diagrammatic view of a moldboard plow in operation and showing one position of the implement attaching and draft control apparatus, Figure 8 is a view similar to Figure 7 showing another position of the implement attaching and draft control apparatus, and Figure 9 is an enlarged detail, with parts removed, of a portion of the draft control and weight transfer mechanism.

Referring to the drawings, the implement attaching and draft control apparatus of this invention is associated with a tractor having a conventional longitudinally extending body 10, rear axle structures 11 and laterally spaced rear drive wheels 12 and 13.

An articulated draft member or drawbar 14 is provided, and includes a forward section 15 in the form of a bail having laterally spaced forwardly converging arms 16 and 17 connected by a brace 18.

The forwardmost ends of arms 16 and 17 of the bail are parallel and are apertured to receive pins 19 projecting from opposite sides of ball 20 adapted for universal pivoting reception in a socket 21 formed in the lower end of a hitch arm 22 which is affixed, as by welding, to a transverse shaft 23 rotatably supported at opposite ends thereof in a bracket 24 affixed to the body of the tractor and projecting downwardly therefrom. The draft member 14 is thus connected in draft-receiving relation to the tractor through hitch arm 22, and by means accommodating longitudinal movement of the draft member by virtue of the fact that the shaft 23 is rotatably carried between the legs of bracket 24 causing arm 22 to swing about the axis thereof in a longitudinal direction.

Draft member 14 also includes an articulated rear section in the form of laterally spaced longitudinally elongated socket members 25 and 26 pivotally connected by transversely extending pivot pins 27 to arms 16 and 17, respectively. The socket members 25 and 26 are thus capable of swinging in a vertical plane relative to bail 15 about the axis of the pins 27. The rear end of each of the arms 16 and 17 of the bail or forward section 15 is bent upwardly to form an extension 28, functioning as a stop, by engaging the upper portion of the socket member associated therewith to limit the downward swing of the socket member with respect to the bail.

In cross-section each of the socket members 25 and 26 is in the form of an inverted U, and these sockets are adapted to slidably receive the laterally spaced complementary longitudinally elongated shafts 29, only one shaft being shown, of an implement in the form of a moldboard plow 30. Each of the socket members 25 and 26 is provided with a base in the form of a bar 31 terminating short of the forward end of the associated socket member and forming a support for the lower surface of the shaft member 29. The forward end of each of the shafts 29 is tapered and beveled as indicated in Figure 1, and base 31 extends from the rear end of the socket member forwardly and upwardly to conform to the taper on the lower surface of shaft 29, both the base 31 and the shaft 29 terminating short of the forward end of the socket member to avoid engagement with end 28 of the forward draft section 15.

Each of the socket members 25 and 26 is notched at 32 to register with a complementary groove provided in the upper surface of each of the shafts 29 (not shown) and to receive a latch 33 shown in the locked position in Figures 1 and 2. The shafts 29 are held against longitudinal displacement in the sockets 25 and 26 and the implement 30 becomes integral with the tractor in that its entire weight can be supported on the tractor in transport position of the implement.

Latch member 33 is provided with laterally projecting trunnions 34, rockably received in a groove 35 in the socket member, and having secured thereto projections 36 engaged by a leaf spring 37 fixed to the upper surface of the associated socket member and operative to hold the latch in its locking position. The latch is released simply by rocking it rearwardly about the axis of trunnions 34. When the latch is released the tractor can simply be driven away from the implement to disconnect it therefrom and a re-connection can be made merely by backing the tractor to the implement until the shafts 29 are received in the respective sockets 25 and 26.

The vertical position of the draft member 14 to adjust its height to a position corresponding to that of the shafts 29 when the implement is to be connected thereto, so that the socket members will easily and slidably receive the implement shafts, is accomplished by lift means mounted on the tractor and including a transversely extending rock shaft 38 rotatably mounted in bearings 39 and 40 at the upper ends of brackets 41 and 42 affixed to opposite sides of the tractor body. Lift arms 43 and 44 are affixed to opposite ends of shaft 38 and extend rearwardly therefrom. Each of the arms 43 and 44 is bifurcated for pivotal connection to the upper ends of a pair of lift links 45 and 46. Left hand link 45 comprises a shaft portion 47 slidably receivable in a sleeve member 48 having a lower clevis portion 49 providing a slot for the sliding reception of a cross-head on the lower end of shaft 47 to prevent its displacement from sleeve 48 while accommodating sliding movement thereof in the clevis 49. The lower end of clevis 49 is mounted upon a pivot pin 51 carried by a pair of lugs 52 affixed to and projecting upward from the left-hand socket member 25.

Lift arm 44 on shaft 38 is likewise bifurcated at its rear end for pivotal connection to a swivel 53 in which is rotatably received a rod 54 threaded for reception in a sleeve 55, the lower end of which is pivotally mounted upon a pin 56, carried between a pair of upwardly projecting lugs 57 affixed to and extending upwardly from socket 26. Suitable collars 53a and 53b are provided on rod 54 above and below the swivel, and the lower collar may, if desired, be adjusted downwardly on the rod to accommodate limited telescoping between the rod and swivel. This is accomplished by loosening set screw 53c and lowering the collar the amount desired. Rod 54 is provided at its upper end with a handle 58 by which the rod 54 can be rotated to shorten or lengthen the lifting link 46 for the purpose of leveling laterally, about a longitudinal axis, the drawbar or draft member 14 to effect leveling of the implement, such as the plow shown in Figure 1, and to adjust the relative vertical positions of the sockets 25 and 26 to line them up with the complementary shafts 29 of the implement. When certain kinds of implements are mounted on the tractor it is desirable that the draft structure 14 be allowed to float freely in a vertical plane about the axis of the ball and socket connection 20, 21 and this is accomplished through telescoping of links 45 and 54. However, in the case of a moldboard plow such as that illustrated it is necessary that it be held rigidly against tilting about a longitudinal axis so that the leveling adjustment chosen can be maintained, and this is accomplished by means of a pin 59 optionally received in a suitable opening provided in clevis 49 and adapted to pass therethrough and engage the lower surface of cross head 50.

Raising and lowering of draft structure 14 to vertically move the implement connected thereto between an operating and transport position and to adjust its depth of operation, is accomplished by means of power derived from the tractor power plant and transmitted by means of fluid under pressure supplied from a tractor power source, not shown, and delivered to a hydraulic ram 60 comprising a cylinder 61 receiving fluid under pressure through hose lines 62, and having at its lower end a clevis 63, anchored to a pivot pin 64 carried at the end of one arm 65 of a rockable member or lever in the form of a bell crank 66 fulcrumed upon a pivot pin 67 carried in a bearing 68 at the lower end of bracket 41. Rockable member 66 is held against rocking about the axis of the pivot pin 67 during operation of the hydraulic ram 60 to raise and lower the hitch means 14 and the implement connected thereto by means to be made clear hereinafter. Admission of fluid under pressure into the cylinder 61 in the position of the parts indicated in Fig. 2, extends piston rod 68, which is pivotally mounted upon a pin 69 carried between a pair of lugs 70 affixed to lift arm 43. Extension of the piston rod in the cylinder moves the implement attaching apparatus and therefore the implement connected thereto from a lowered position such as is indicated in Figure 2 to a transport position indicated in Figure 1.

When an implement such as a tractor mounted moldboard plow encounters abnormal draft conditions such as hard ground, the plow bottoms tend to dig into the ground, requiring more tractive effort to propel it, resulting in a tendency toward slippage of the tractor drive wheels. Applicants have devised means for offsetting the tendency of the tractor drive wheels to lose traction by transferring some of the weight of the implement to the tractor to increase the drive wheel traction. The shape of bell crank 66 is shown particularly well in Figure 9 as including a pair of plates 71 straddling arm 65 and welded thereto. Plates 71 are also apertured at 72 to receive the pivot pin 67, and additional apertures are provided to receive one end of a shaft 73 to which the plates 71 are welded, the other end of the shaft 73 projecting laterally from the plates 71 having affixed thereto a lever arm 74 forming the other arm of the bell crank 66.

The rear edge of lever arm 74 is a curved camming surface 75 engaged by a square block 76 mounted upon a pin 77 carried at the end of a clevis 78 affixed to one end of a thrust rod 79, the forward end of which is bent laterally for reception in an opening provided in an arm 80, affixed to and projecting upwardly from shaft 23 and forming with hitch arm 22 a lever pivoted medially of its ends by which draft is transmitted to bell crank 66. Thus, a rearward pull upon the draft member 14 due to excess draft encountered by the implement causes the shaft 23 to rock in a counter-clockwise direction, as viewed in Figure 2, transmitting a forward thrust on rod 79 and acting through block 76 as an abutment engaged by arm 74 to exert a force in a direction to rock the rockable member or bell crank 66 in a counterclockwise direction about the axis of its fulcrum 67, as viewed in Figure 2. This rocking of the bell crank 66 causes the hydraulic ram 60 to function as a thrust link and exert a force in an upward direction against the lift arm 43 to rock shaft 38, exerting a force in a direction to lift the draft structure 14 and the implement connected thereto.

The effect of the implement encountering hard ground or an obstruction is illustrated schematically in Figures 7 and 8. The implement's own draft pull is thus utilized to exert a lifting effect thereon, the weight taken from the implement in this manner being transferred to the tractor by adding down pressure to the rear drive wheels and causing them to more aggresively engage the ground so that the full power of the tractor can be utilized to pull the implement through the ground. In Figure 7 the moldboard plow is shown in normal operation at a selected depth and a position of the implement attaching and draft control apparatus is illustrated therefor. In this instance, although the draft structure 14 is connected to the hitch arm 22 at a point in advance of the rear axle of the tractor and under the tractor body, a virtual hitch point is achieved at "A" rearwardly of the tractor rear axle and much closer to the plow bottom 81, the point "A" being a virtual hitch point for the plow determined by the intersection of a generally vertical line drawn through the pivotal connection of lift links 45 and 46 with their respective sockets 25 and 26 and lift arms 43 and 44, and a line drawn through the axes of pins 19 and 27. When excess draft is encountered by the implement, hitch arm 22 swings rearwardly, as indicated in Figure 8, about the axis of shaft 23, arm 80 and thrust rod 79 move forwardly, rocking bell crank 66 in a clockwise direction as viewed in Figures 7 and 8. An upward thrust is exerted through the ram 60 against lift arm 43 to raise the implement, bail 15 swinging upwardly about its pivotal connection at 19 to arm 22 and sockets 25 and 26 pivoting about the axes of pins 27 to a position such as indicated in Figure 8. The lifting force on the implement has been transferred to the tractor rear wheels causing a greater area thereof to engage the ground, off-setting somewhat the upward movement of the lift arms 43 and 44 and maintaining the plow bottom 81 at substantially the same operating depth.

Rearward swinging of arm 22 and therefore rearward movement of the implement relative to the tractor under the influence of excessive draft forces is limited by the provision of a stop in the form of an upwardly projecting extension 82 on arm 22 engageable with the transverse portion 83 of a yoke 84 affixed to the transverse portion 85 of bracket 24.

Sockets 25 and 26 are biased to a position in general alignment with the arms 16 and 17 of the forward section or bail 15 by the provision of a leaf spring 85 which has an offset section 86 engaging the under surface of bar 31 and held in place by a pair of spring sections 87 and 88 secured to spring 85 and base 31 by a bolt 89. The forward end of spring 85 is bent upwardly and engages extension 28. Thus, when the implement is detached from the tractor and the tractor operator wishes to back the tractor to the implement and cause the socket members 25 and 26 to slidably receive the shafts 29 of the implement, he elevates the socket by actuation of ram 60 to the proper elevation to receive the shafts and the springs 85 off-set the tendency of the sockets to pivot about the axes of the pins 27, so that the sockets can be brought into a position generally parallel with the ground to facilitate reception of the complementary shafts on the implement.

Lateral stability of the implement attaching structure and the implement relative to the tractor is provided by stabilizing means generally indicated at 90 and shown in some detail in Figures 4 and 5. A transverse shaft 91 is supported at the lower ends of a pair of hanger bars 92, the upper ends of which are pivotally mounted on pins 93 carried by brackets 41 and 42. The lower ends of the hangers 92 are secured to a transverse sleeve member 94 in which shaft 91 is rotatably mounted. A rearwardly extending plate 95 is affixed to one end of shaft 91 and is straddled by a pair of vertically spaced straps 96, the forward ends of which are pivotally mounted upon a pin 97 extending through shaft 91. The rear ends of straps 96 are pivotally connected by a pin 98 to a lug 99 affixed to and projecting from socket number 26.

By virtue of the pivotal suspension of hangers 92, shaft 91 is capable of swinging forwardly and rearwardly about the axis of pins 93, and straps 96 are capable of lateral swinging about the axis of pin 97, so that draft structure 14 is capable of lateral swinging with respect to the center line of the tractor to permit an implement such as a moldboard plow to follow in the path of the tractor, and the rotary mounting of shaft 91 in sleeve 94 accommodates vertical movement of the hitch structure 14. In order to limit the lateral swinging of the draft structure 14 plate 95 is provided with a transverse slot 100 adapted to receive a pin 101 which extends through straps 96. With certain implements it is desired that the stabilizing structure not function to permit lateral swinging of the implement and the draft structure, and pin 101 may be removed from the slot 100 and placed in another opening 101a in straps 96 which register with a complementary opening in plate 95 (not shown).

When a moldboard plow encounters abnormal draft conditions in the form of hard ground, for example, a component of force is directed vertically downwardly on the plow. The added draft increases the difficulty of pulling the plow through the soil due to impending wheel slippage. According to the invention herein described, this difficulty is overcome by transferring a part of the weight of the implement to the tractor to increase the tractive effort thereof. This is accomplished by utilizing the longitudinal pull of the implement in the ground and the longitudinal movement thereof relative to the tractor to rock arm 80, lever 74 and lift arm 43 in a direction to apply a lifting force thereto which becomes a force directed downwardly upon the tractor drive wheels to impart greater traction thereto.

This lifting force, of course, must be less than that actually required to lift the implement to transport position, otherwise the implement will leave the ground. The amount of weight it is desirable to transfer from the implement to the tractor varies with the operating depth of the implement and other factors. The amount of weight transferred in terms of lifting effort varies with the length of the lever arm represented by the contact of block 76 with arm 74 on bell crank 66.

As previously noted, block 76 is pivotally mounted at the end of member 78 on pin 77, upon which is also mounted the lower bifurcated end of an adjusting member 102 having a handle 103 at its upper end accessible to the tractor operator. Adjuster 102 is rectangular in section and it is vertically slidably receivable in suitable slots (not shown), provided in vertically spaced brackets 104 and 105, mounted on bracket 41, for relative longitudinal movement therein. The forward edge of the adjuster is provided with a plurality of notches 106 and a leaf spring 107 secured at one end to the upper bracket 104 engages the rear edge of the adjuster 102 to urge it toward the forward end of bracket 104 until the latter is received in a selected one of the notches 106. When turning the tractor at the end of a field the implement is raised by actuating ram 60. Any lost motion in the bell crank to which the ram is anchored is quickly taken up by rocking of the bell crank until shaft 73 engages the lower end of bracket 41.

By moving the adjuster 102 up and down with respect to the brackets 104 and 105, the position of block 76 with respect to lever arm 74 is varied, the rear edge 75 of lever arm 74 being in the form of a camming surface and the position of block 76 with respect thereto, as shown in Figure 2, providing the longest lever arm and therefore the greatest amount of weight transfer available. A neutral setting with the weight transfer apparatus locked out is utilized for some implements and for this purpose registering apertures 108 are provided in member 78 and arm 74 to receive a suitable pin and hold block 76 adjacent fulcrum 67. In this case bell crank 66 does not rock and cylinder 61 is solidly anchored so that it functions only to lift the implement.

Under some circumstances where an implement such as a disc harrow is to be mounted on the tractor by the implement attaching apparatus of this invention, it is desirable to transfer weight from the tractor to the implement by exerting a down pressure on the latter in lieu of using the conventional weight required to hold such implement in the soil. For such eventualities the lever arm 74 of bell crank 66 is provided with an extension 109 on the opposite side of the axis of shaft 73 from arm 74 forming another lever arm so that when the adjuster 102 is lowered until block 76 engages the extension 109, any excess draft upon the implement is reflected in the rocking of bell crank 66 in a clockwise direction, as viewed in Figure 2, to depress lift link 43 and urge the implement to its work.

With particular reference to Figures 7 and 8, it will be observed that the moldboard plow illustrated maintains substantially the same operating depth in normal operation as when abnormal draft conditions are encountered. Although the lever 80, thrust rod 79 and lever arm 74 will not normally be in relaxed condition while the implement is being propelled through the ground because of the pressure of the soil thereagainst, Figure 7 illustrates the approximate positions of the parts under average conditions. In Figure 7 the plow bottom is operating at a selected depth and the virtual hitch point thereof to the tractor is indicated at "A" as the intersection of lines drawn through lift link 46 and draft member 14. The rear section or socket member 26 is at an angle with respect to the bail section 15, having pivoted about the axis of pin 27, and the implement is capable of vertical floating movement to follow the contour of the ground by the socket 26 being separated from stop portion 28 of bail 15. This is made possible by the fact that lift arms 43 and 44 are mounted on shaft 38 for rocking therewith, and bell crank 66 is free to rock in a clockwise direction, as viewed in Figures 7 and 8, within the limits of the slot in clevis 78 receiving the lever arm 74.

In Figure 8 the plow bottom 81 has encountered hard soil or has engaged an obstruction which causes it to move rearwardly with respect to the tractor. Thus in Figure 8 arms 22 and 80 and bell crank 66 have been rocked to the positions shown and this motion has been transmitted to lift arms 43 and 44 to exert a lifting effect on the implement. The effect of the lift imparted to the implement is to transfer the weight thereof to the tractor, and in Figure 8 it is shown that the height of sockets 25 and 26 above the ground remains substantially the same as in Figure 7, the operating position of the plow bottom 81 remains substantially the same, and the added weight on the tractor drive wheels is reflected in the digging of the rear drive wheels 12 deeper into the furrow and the flattening of the tire thereon. Therefore, the depth of operation of the plow 81 remains substantially constant under all conditions, the forces acting upon the plow bottom causing it to move rearwardly with respect to the tractor being converted into the forces necessary to provide the required traction for the tractor drive wheels to continue pulling the implement through the soil.

It is believed that the operation of the draft control and weight transfer apparatus incorporated in the implement attaching structure of this invention will be clearly understood from the foregoing description. It should likewise be understood, however, that the invention has been described in its preferred embodiment only and that modifications may be made in the invention without departing from the spirit thereof or the scope of the appended claims.

We claim:

1. Implement attaching apparatus for a tractor, comprising a longitudinally extending articulated draft structure carrying an implement at its rear end and pivotally connected at its forward end to the tractor in draft-receiving relation, said latter connection including means accommodating horizontal movement of said draft structure relative to the tractor in response to excessive draft forces acting on the implement, said draft structure including pivotally connected front and rear sections accommodating vertical floating of the rear section relative to the front section, a lift arm mounted on the tractor, a generally vertical lift link pivotally connecting said lift arm to said rear section, whereby a virtual hitch point is provided at the intersection of lines drawn through said lift link and said forward section, and a force transmitting member on the tractor connected to said draft structure and to said arm and operative to transmit directly the horizontal movement of said draft structure to said lift arm to rock the latter.

2. The invention set forth in claim 1, wherein said force transmitting member includes a lever fulcrumed on the tractor and serving as an intermediary directly connecting said draft structure to said lift arm and rockable in one direction in response to horizontal movement of the draft structure relative to the tractor, said lever being operatively connected to said lift arm to swing the latter with the rocking of the lever, said lever being rockable in the same direction relative to said lever to accommodate the upward floating movement of said rear section relative to said forward section.

3. In draft control means for an implement adapted for attachment to a tractor having a lift arm thereon wherein longitudinal movement of the implement relative to the tractor is transmitted to the implement lift arm, a lever arm pivotally mounted on the tractor, a connecting rod operatively connecting said implement to said lever arm for rocking the latter in one direction in response to rearward movement of the implement, a thrust member connecting said lever to said lift arm, the connecting means between said rod and said lever comprising an abutment carried by said rod frictionally engageable with one edge of said lever to transmit motion of the rod thereto to rock the lever in said one direction to exert a lifting force on the implement, said lever being movable relative to the rod in the same direction to accommodate floating movement of the implement independently of said lever, and means for shifting the radial position of said abutment relative to the fulcrum of said lever to vary the effective length of the latter.

4. Draft control means for an implement adapted for attachment to a tractor having a lift arm thereon wherein movement of the implement relative to the tractor in response to draft forces acting thereon is resisted by the force of gravity acting on the implement, comprising a lever fulcrumed on the tractor operatively connected to the implement lift arm for transmitting rocking movement of the lever thereto, and means operatively connecting the implement to said lever for rocking the latter in one direction in response to movement of the implement resulting from draft forces acting thereon including a connecting rod, means carried by the rod operatively connected with said lever for rocking the latter in said one direction to exert a lifting force on the implement, said lever being movable relative to the rod in the same direction to accommodate floating movement of the implement independently of said lever, and means for shifting the position of said connecting means relative to the fulcrum of said lever to vary the effective length of the latter.

5. Implement attaching structure for a tractor comprising a longitudinally extending draft member, means connecting the forward end of said draft member to the tractor in draft-receiving relation, said connecting means including means accommodating longitudinal movement of the draft member relative to the tractor in response to draft forces acting on the implement, a pair of laterally spaced longitudinally elongated socket-like attaching members adapted to slidably receive complementary shaft-like members on the implement and pivotally mounted on said draft member for vertical swinging on transverse axes relative to the draft member to accommodate relative floating movement between the implement and tractor, power lift arms mounted on the tractor operatively connected to said socket like members to raise and lower the implement and draft member upon activation of said power lift arms, motion transmitting means on the tractor, and means operatively connecting said motion transmitting means directly to said lift arms and to said draft member effective to translate longitudinal movement of the draft member into a force reacting against said lift arms to lift them and the implement.

6. Implement attaching apparatus for a tractor, comprising a longitudinally extending draft member having a rigid forward section pivotally connected to the tractor body in draft-receiving relation and extending rearwardly therefrom and a rear section including a longitudinally elongated attaching member adapted for slidable cooperation for a major portion of its length with a complementary longitudinally elongated attaching member on the implement to provide a stable integral connection therebetween, means pivotally connecting the forward end of said rear section attaching member to the forward section attaching member for vertical swinging about a transverse axis, lift means on the tractor including a generally horizontal lift arm, a generally vertically extending lift link pivotally connecting said lift means to said rear section attaching member to provide a virtual hitch point for the implement determined by the intersection of a line drawn through the pivotal connection of said rear section to said forward section and said forward section to the tractor with a line drawn through the pivots of said lift link means connecting said forward section to the tractor accommodating longitudinal movement of the attaching apparatus relative thereto in response to excess draft forces acting on the implement, and a force transmission member mounted on the tractor connected directly to said attaching apparatus and to said lift arm for transmitting thereto the movement of said attaching apparatus.

7. The invention set forth in claim 6 wherein the connection of said forward section to the tractor is made through a longitudinally swingable link, a first thrust member connects said link to said force transmission member and a second thrust member connects said force transmission member to said lift arm.

8. The invention set forth in claim 7 wherein said force transmitting member is a bell crank fulcrumed on the tractor the arms of which are connected to said thrust members.

9. In draft control means for an implement adapted for attachment to a tractor by means accommodating movement of the implement relative to the tractor in response to draft forces on the implement, a lift arm mounted on the tractor and swingable between positions corresponding to raised and lowered positions of the implement, a lift link connecting said lift arm to the implement for raising and lowering the implement, a lever fulcrumed on the tractor having a lever arm on opposite sides of the fulcrum thereof, a thrust member connected to the implement and to one arm of said lever operative to rock the latter in one direction upon movement of the implement relative to the tractor, means operatively connecting the other arm of said lever to said lift arm to swing the latter upon rocking said lever, and optionally operable means for connecting said thrust member to said other arm of said lever to rock the latter in the other direction in response to said draft forces on the implement.

10. The invention set forth in claim 9, wherein said lever is a bell crank having one arm connected to said thrust member for rocking the bell crank in one direction, and a third arm optionally connectable to said thrust member for rocking the bell crank in the other direction in response to said movement of the implement relative to the tractor in response to draft forces acting thereon.

References Cited in the file of this patent

UNITED STATES PATENTS

| | | |
|---|---|---|
| 2,372,459 | Todd | Mar. 27, 1945 |
| 2,626,551 | Starr | Jan. 27, 1953 |
| 2,700,330 | Starr | Jan. 25, 1955 |
| 2,714,346 | Valin | Aug. 2, 1955 |
| 2,741,043 | Lindbeck | Apr. 10, 1956 |
| 2,751,835 | Silver | June 26, 1956 |
| 2,779,260 | Orelind et al. | Jan. 29, 1957 |
| 2,785,616 | Jones | Mar. 19, 1957 |

FOREIGN PATENTS

| | | |
|---|---|---|
| 155,707 | Australia | Mar. 16, 1954 |
| 1,007,361 | France | Feb. 6, 1952 |
| 253,566 | Great Britain | June 14, 1926 |